3,193,585
PROCESS FOR OBTAINING PURE META-CRESOL FREE OF NITROGEN COMPOUNDS FROM MIXTURES CONTAINING META-CRESOL
Ludwig Rappen and Hans Wille, Duisburg-Meiderich, Germany, assignors, by mesne assignments, to Koppers Company, Inc., a corporation of Delaware
No Drawing. Filed Apr. 3, 1961, Ser. No. 100,022
4 Claims. (Cl. 260—621)

This invention concerns a process for obtaining pure meta-cresol free from nitrogen compounds, from crude cresols which contain meta-cresol, by using the known process of forming a meta-cresol phenol addition product and recovering the meta-cresol from this addition product by splitting.

Attempts have been made by various procedures to obtain meta-cresol practically free from para-cresol. For example: Crude cresols are treated with urea in order to form addition products with the meta-cresol; however, the cresol obtained in this way after splitting the addition product is not suitable for all purposes since it is difficut to make it completely free of nitrogen compounds which act as catalyst poisons when the cresol is treated further catalytically.

Also, the known processes for recovering meta-cresol which have as their basis the formation of addition compounds with sodium acetate or benzidine do not always yield really pure meta-cresol in a simple manner.

Separation processes which make use of the different acidities of the meta-cresol and the para-cresol involve difficulties and provide only with difficulty the necessary sharp separation.

The same disadvantages are inherent in the separation of meta-cresol from crude cresols containing meta-cresol by formation of molecular compounds of meta-cresol and phenol, crystallizing this molecular compound and splitting the compound since the purity of meta-cresol obtained in this way does not exceed about 95%.

It is also possible to produce a meta-cresol, free of para-cresol, by splitting the addition product obtained when one carries out the known formation of the addition product with an excess of phenol, based on the meta-cresol present, in the presence of the parafinic solvents and after washing the addition product with such media. However, nonphenolic impurities act unfavorably on this procedure.

We have now found that a very pure, and even practically 100% pure, meta-cresol which is free of nitrogen compounds can be obtained when the reaction product, obtained by treating the crude cresols with phenol, is separated, cooled and washed with aqueous phenol, is decomposed giving a pure and even an absolutely pure meta-cresol.

In place of acqueous phenol, aqueous solutions of mixtures of phenol and monohydric homologues of phenols other than para-cresol can be used.

The cresol obtained is absolutely free of harmful nitrogen compounds and free of nonphenolic bodies and can therefore be worked up in the presence of catalysts sensitive to nitrogen compounds; the yield is favorable and the disadvantages from the use of foreign materials fall away.

According to a recommended procedure a clear phenol solution saturated with water at 10° C. is used as the wash liquor.

Aside from water-phenol mixtures and similarly an aqueous phenol solution, one can use according to a further recommended procedure aqueous solutions of phenol and its monohydric homologues other than para-cresol. Advantageously one can use with, or in place of, water phenol mixtures, aqueous phenol solvent mixtures of phenol and meta-cresol in the form of a water-phenol-meta-cresol solution as a wash liquor; in which case it is of advantage to have the ratio of phenol and meta-cresol that of the addition product (one mole of phenol to two moles of meta-cresol), in which case advantageously a clear water-phenol-meta-cresol solution is used.

Further conditions and advantages of the process can be seen from the following descriptions of the details of the process and from the examples. The amount of phenol which is added to the meta-cresol containing crude cresol is so regulated in the recommended form of carrying out the process, so that the freezing point of the mixture of crude cresol and phenol is at a maximum. The maximum, in general, is dependent upon the composition of the crude cresol. The maximum freezing point is advantageously determined accurately ahead of time in that varying amounts of crude cresol with phenol are made to crystallize. From a diagram prepared from data obtained in this way the maximum value of freezing points and thereby the most advantageous mixture relationship for preparing the molecular compounds can be read off. The advantage of the determination of the most favorable mixture relationship is to be seen in that the crystallization can be carried out at the highest temperature and that, other than the desired addition product, no other addition products such as addition products of phenol and ortho-cresol, para-cresol or of meta-cresol and para-cresol can crystallize out.

The mixture is cooled with slow stirring to a temperature which is about 5 to 15° C. under the highest crystallization temperature value previously established. The addition product crystals which separate out are separated for example by centrifuging, in which case the temperature in the centrifuge basket should be about 5° C. above the temperature of the feed. The crystal mass separated from the filtrate is washed in the centrifuge with aqueous phenol or aqueous phenol mixtures free of para-cresol. A close relationship exists between the temperature of the addition product to be washed and the temperature and composition of the wash liquor.

The temperature of the addition product to be washed and that of the wash liquor should be several degrees, advantageously 2 to 3° C., above the crystallizing point of the wash liquor. If they lie under this point, then the wash liquor crystallizes out in the centrifuge basket and washing is incomplete. If the crystallizing point is appreciably exceeded, then closely dependent upon the washing temperature more or less of the addition product to be washed is dissolved by the wash liquour and the yield is decreased. The temperature intervals are therefor narrowly limited. A pure phenol saturated with water to form a clear solution crystallizes at about 10° C. If such a water-saturated pure phenol is used as a wash liquor, then the washing temperature should be about 12° C. According to a recommended procedure, mixtures of water, phenol and monohydric homologues of phenols can be used as wash liquors in which case, for suitable combinations, the crystallization points of these wash liquours can lie far under 0° C., so that the washing can be carried out at temperatures of 0° C. and below with advantages over the use of aqueous phenols as wash liquors since the possibility of washing at lower temperatures can be coupled with lower centrifuging temperatures and in turn can lead to better yields.

According to a recommended procedure, mixtures of water, phenol and meta-cresol; especially such that the phenol and the metacresol are in the relationship of the addition compound, that is, one mole of phenol to two moles of meta-cresol are used as wash liquors. Such wash liquors can be produced by saturating the addition compound with water at 0° C. They form clear solutions which contain 25.3% phenol, 58.1% meta-cresol and 16.6% water. The crystallizing temperature lies at about ± 0° C. A mixture of such composition can be used not only for washing but also for purification of the addition product by re-crystallization. At the higher temperatures marked solutions occur. By using such wash mixtures for re-crystalling the addition product, losses of addition product, and therefore also of pure meta-cresol, can be minimized. By minor variations one can also make from the three components, wash liquor whose crystallizing temperatures lie still lower. For example, a solution, of 51.1% meta-cresol, 34.5% phenol and 14.4% water freezes below −3° C. For the preparation of such liquids, advantageously, the phenol is first mixed with water and the designated amount of meta-cresol is then added.

The amount of wash liquor is regulated according to the purity of the centrifuged crude and unwashed addition products. However, not more than a maximum of 15% of wash liquor, based on the addition product to be washed, is necessary to obtain complete purity.

By the known distillative working up of the addition product so washed, one obtains, along with pure meta-cresol, which is absolutely free from nitrogen compounds, an especially pure phenol having a freezing point above 40.8° C.

The meta-cresol obtained has a freezing point of about 11.8° and corresponds to a purity of more than 99.5%.

The mother liquor obtained by treating the crude cresols with phenol can be worked up to obtain other compounds is known manner.

The following examples illustrate recommended procedures for carrying out the invention.

Example 1

4,350 kilograms of a crude cresol containing 61.8% (=2,688 kilograms) of meta-cresol and having a boiling range of 200.3° C.–204.2° C. (5–95%) are mixed with 1,283 kilograms of phenol having a freezing point of 40.2 C. after it had been determined that this mixture had a maximum freezing point of 9.2° C. The mixture was cooled with stirring to about +1° C.

A mixture of liquid and crystals formed, out of which the liquid was centrifuged at +6° C., the crystal product was washed at +12° C. with 10% of its weight of a clear phenol solution saturated with water at 10° C.

1,950 kilograms of washed product (34.6% yield) were obtained which, after distillation, yielded 1,258 kilograms fo meta-cresol completely free from nitrogen compounds and having a freezing point of 11.9° C., that is in a purity of more than 99.6%. Along with the 145 kilograms of intermediate fraction, 547 kilograms of purest phenol having a freezing point of 40.9° C. were obtained.

Example 2

4.350 kilograms of a crude cresol containing 63.2% (2,749 kilograms) meta-cresol and having a boiling range of 200.5° C. to 203.8° C. (5–95%) were mixed with 1,298 kilograms of phenol having a freezing point of 40.3° C. The freezing point of this most favorable mixture had previously been determined to be 9.4° C. The mixture was cooled with stirring to −3° C.

The mixture of liquid and crystals obtained on cooling was centrifuged at +2° C. The crystals obtained were washed at +3° C. with 8% by weight of a clear solution at 25.3% phenol, 58.1% meta-cresol, and 16.6% water.

2,145 kilograms of washed addition product (38.0% yield) were obtained which after distillation yielded 1,398 kilograms of pure meta-cresol, free from nitrogen compounds and having a freezing point of 11.8° C. Along with 140 kilograms of intermediate fractions, there was obtained 608 kilograms of purest phenol having a freezing point of 40.9° C.

Example 3

The mixture of Example 2 was cooled to −8° C. The crystals obtained werec entrifuged at −3° C. and at this temperature were washed with 12.5% of clear solutions of 34.5% phenol, 51.1% meta-cresol and 14.4% water.

2,395 kilograms of washed addition product (42.4% yield) were obtained which after distillation yielded 1,565 kilograms of pure meta-cresol, free of nitrogen compounds, having freezing point of 12.0° C. along with 150 kilograms of intermediate fractions and 680 kilograms of phenol having a freezing point of 40.9° C. The intermediate fractions obtained during the distillation could be resolved into meta-cresol and phenol quantitatively by redistillation.

What is claimed is:

1. In a process for obtaining meta-cresol from a crude cresol liquid containing meta-cresol wherein phenol is mixed with said crudel iquid to form a phenol-meta-cresol addition product, the mixture is cooled to crystallize out said addition product as a solid, and said solid is sepaarted from said liquid, the improvement comprising washing said solid with a wash liquor selected from the class consisting of phenol saturated with water and mixtures of phenol and meta-cresol saturated with water, said wash liquor being at a temperature of 2–3° C. above its crystallization point, and decomposing said solid to form meta-cresol and phenol.

2. In a method of separating meta-cresol from a liquid mixture of cresol isomers wherein phenol is added to said liquid mixture, said mixture is cooled to cause a solid phenol-meta-cresol addition compound to crystallize, and said solid is separated from said liquid mxture, the improvement comprising washing said solid with phenol saturated with water at a temperature 2–3° C. above the crystallization point thereof to remove a residual portion of said liquid mixture from said solid, and decomposing said solid to form meta-cresol and phenol.

3. In a process for isolating meta-cresol from cresol isomers as a solid phenol-meta-cresol addition compound, the improvement which comprises: washing said solid addition compound with a wash liquor selected from the class consisting of phenol saturated with water and a mixture of phenol and meta-cresol saturated with water at a temperature 2–3° C. above its crystallization point, and decomposing said solid addition compound to form meta-cresol and phenol.

4. The process of claim 3 wherein said mixture of phenol and meta-cresol is in the ratio of about one mole of phenol to two moles of meta-cresol.

References Cited by the Examiner

UNITED STATES PATENTS

| | | | |
|---|---|---|---|
| 2,042,331 | 5/36 | Carswell | 260—621 |
| 2,339,388 | 1/44 | Engel | 260—621 |

LEON ZIVER, Primary Examiner.

CHARLES B. PARKER, HAROLD G. MOORE, Examiners.